Patented Nov. 3, 1942

2,300,590

UNITED STATES PATENT OFFICE 2,300,590

CONDITIONING OF DRILLING MUDS

Jolly W. O'Brien, Houston, Tex.

No Drawing. Refiled for abandoned application Serial No. 257,459, February 20, 1939. This application June 4, 1941, Serial No. 396,579

8 Claims. (Cl. 252—8.5)

The invention relates to a means and method of conditioning drilling muds of the type used in the rotary method of drilling wells.

This application is a re-filing of my prior copending application, Serial No. 257,459, filed Feb. 20, 1939 for Conditioning of drilling muds.

The requirements of a satisfactory drilling mud are many and varied, depending upon the conditions encountered in the formations, the rate and nature of the drilling, and the pressures and temperatures encountered.

The viscosity and the specific gravity of the drilling mud must be controlled in order to obtain the desired results. If the viscosity becomes too great the friction losses due to circulating the mud become excessive, the mud must therefore be pumpable. The mud must have a suitable gelling quality which must be sufficient to carry the cuttings from the well bore, and maintain cuttings in suspension when circulation is suspended, but insufficient to stick the drill stem, in event circulation is discontinued for a period of time, or to prevent reestablishment of circulation when desired. The specific gravity must be controlled in order to maintain a sufficient pressure on the formation to prevent blowouts. The mud must be sufficiently thin to prevent gas cutting and to enable the separation of the cuttings from the mud at the surface.

With the foregoing requirements in mind it is one of the objects of the present invention to provide materials to be admixed with the drilling mud so as to condition it to comply with the foregoing conditions.

Another object of the invention is to provide a finely ground material to be added to the mud which material is composed of strontium sulphate and impurities therein.

Another object of the invention is to add to the drilling mud a finely ground material composed substantially of strontium sulphate along with a viscosity reducing chemical.

Another object of the invention is to add strontium sulphate and dolomite to a drilling mud until the viscosity thereof approaches 40 centipoises (Stormer viscosimeter at 600 R. P. M.) and then adding a viscosity reducing chemical whereby the viscosity is reduced to approximately 20 centipoises and thereafter again adding finely ground strontium sulphate to increase the specific gravity of the drilling mud while maintaining the viscosity below 40 centipoises.

Another object of the invention is to maintain a drilling mud within the normal range of workable viscosity, namely, between 20 and 40 centipoises while increasing the specific gravity to approximately 14 pounds per gallon by the adding of an impure strontium sulphate and a viscosity reducing chemical.

Another object of the invention is to add to a drilling mud, a solid comprising a finely divided impure strontium sulphate to increase the specific gravity, and a viscosity reducing chemical to decrease the viscosity, wherein the addition of such materials results in an unexpected reduction in viscosity when the proportion of solids added is considered.

Another object of the invention is to add a fienly ground material which is in the nature of a celestite as to its general chemical analysis but which material reacts unexpectedly upon the introduction of a viscosity reducing chemical such as a pyrogenic derivative of phosphoric acid.

Another object of the invention is to reduce the viscosity of the drilling mud to which finely divided solids have been added so that additional solids may thereafter be added to obtain a drilling mud composition approximating 14 pounds per gallon when the viscosity approximates 40 centipoises.

Another object of the invention is to provide a method of maintaining the viscosity of a drilling mud below 40 centipoises while increasing the specific gravity to approximate 1.7 which comprises the adding of an impure strontium sulphate and a viscosity reducing chemical.

Another object of the invention is to produce a drilling mud having the specific gravity approximating 1.7 and a viscosity of less than 40 centipoises by adding to the normal drilling mud a finely divided solid having a specific gravity less than 3.75 and a viscosity reducing chemical.

Other and further objects of the invention will be readily apparent as the detailed description thereof is understood.

An impure strontium sulphate having a chemical analysis substantially as follows, when finely ground, has been found to be satisfactory in practicing the invention:

| | |
|---|---|
| Silicon dioxide | 1.72 |
| Oxides of iron and aluminum | 0.08 |
| Calcium oxide | 4.32 |
| Magnesium oxide | 2.06 |
| Barium oxide | 0.84 |
| Strontium oxide | 46.00 |
| Sodium and potassium oxide | 0.94 |
| Carbon dioxide | 5.62 |
| Sulphur trioxide | 35.74 |
| Volatile matter (other than carbon dioxide | 2.73 |
| Uncombined moisture | 0.00 |
| Total | 100.05 |
| Specific gravity | 3.69 |
| Fineness passing 325 mesh | 95% |

It will be noted that the principal ingredients of the material when released are strontium oxide and sulphur trioxide so that the material is substantially strontium sulphate to about 80% while the remaining 20% constitute impurities which are in the nature of a dolomite so that generally the substance may be designated as an impure strontium sulphate or a strontium sulphate and dolomite.

When this material is finely ground it may be added to the drilling mud as desired, depending upon the conditions and circumstances under which the material is to be used. It has been found that in adding the material to an ordinary drilling mud that if a mud having a weight of approximately 9½ pounds per gallon with a low viscosity below 10 centipoises is used as the base, that the mere adding of the material results in a mud of approximately 11½ pounds per gallon weight by the time the viscosity has increased to 40 centipoises due to the addition of the finely divided solid material. Inasmuch as the mud must be readily pumpable it has been found in practice that mud of about 40 centipoises is substantially the maximum viscosity that is satisfactorily serviceable.

In the event it is desired to either reduce the viscosity and maintain the specific gravity the same or it is desired to reduce the viscosity in order that additional solid matter may be added, then a suitable viscosity reducing chemical can be added to the mud. Some such chemicals are the pyrogenic derivatives of phosphoric acid, others may be quebracho extract, gallic acid, caustic soda, sodium hexametaphosphate, tetrasodium pyrophosphate or sodium tetraphosphate.

With a mud such as just described, when an amount of chemical ranging from one part in two thousand down to one part in one hundred twenty-five is added, it has been found that the viscosity is reduced from approximately 40 to approximately 20 centipoises. Thus, if a thinner mud is desired the same specific gravity is maintained while reducing the viscosity one-half. While, on the other hand, if it is then desired to have a heavier mud, additional solid matter may be added until the desired weight is obtained or until the viscosity is again increased due to the addition of such solids to a point approaching the maximum which may be used. In event a still heavier mud is then desired, the mud may be again treated with additional viscosity reducing chemical to again bring down the viscosity so that additional solids may be added, or, as pointed out above, the viscosity may be reduced without the addition of any more solid matter.

It is obvious from the foregoing that satisfactorily serviceable viscosities and specific gravities or combinations of the two may be obtained and maintained by proportioning the amounts of impure strontium sulphate and viscosity reducing chemicals which are added.

The principal feature of the invention resides in the fact that an unexpected reduction in viscosity beyond that which would normally and usually be obtained in the drilling mud results upon the addition of the viscosity reducing chemical after the impure strontium sulphate has been added and that no similar results are obtained when other materials of substantially the same specific gravity are added.

The unexpected results are attributed to the strontium sulphate or the dolomite or a combination of the two when they are admixed with the drilling mud in the presence of or when a viscosity reducing chemical is added thereto.

The discovery of the unexpected results due to the admixing of these materials may be due to the re-arrangement of the molecular structure of the compounds which could have a decided effect upon the surface characteristics of the particles and thus might account for the exceptional reduction in viscosity, or there may be a chemical reaction between the materials.

Broadly, the invention contemplates the use of a finely divided material having a specific gravity approximating 3.75 which when admixed in a drilling mud while lowering the viscosity due to the presence of a viscosity reducing chemical results in a drilling mud which is satisfactorily serviceable and has a weight approximating 14 pounds per gallon.

What is claimed is:

1. An admix for aqueous drilling mud comprising one part or less of a viscosity reducing chemical and ninety-nine parts or more of a material having substantially the following composition:

| | |
|---|---|
| Silicon dioxide | 1.72 |
| Oxides of iron and aluminum | 0.08 |
| Calcium oxide | 4.32 |
| Magnesium oxide | 2.06 |
| Barium oxide | 0.84 |
| Strontium oxide | 46.00 |
| Sodium and potassium oxide | 0.94 |
| Carbon dioxide | 5.62 |
| Sulphur trioxide | 35.74 |
| Volatile matter (other than carbon dioxide) | 2.73 |

2. An admix for aqueous drilling mud comprising a compound including as its major component a celestite ore and a proportion of a pyrogenic derivation of phosphoric acid in sufficient quantity to act as a viscosity reducing chemical in the mud.

3. An admix for aqueous drilling mud comprising a compound including as its major component an impure strontium sulphate containing minor amounts of dolomite and as a minor component a caustic alkali in combination with an inorganic material or acid properties such as sodium acid pyrophosphate in an amount to serve as a viscosity reducing chemical in the drilling mud.

4. In the art of controlling the specific gravity and viscosity of an aqueous drilling mud used in the rotary method of drilling wells which comprises, adding finely ground celestite to the drilling mud, adding a very slight amount of a viscosity reducing chemical to the mud as the viscosity tends to increase so as to decrease the viscosity below the maximum operating range, and adding additional celestite.

5. A method of maintaining the viscosity of an aqueous drilling mud within the normal operating range between twenty and forty centipoises while increasing the weight from ten to thirteen and a half pounds per gallon which comprises the steps of alternately adding celestite in an amount capable of maintaining such operating range and a viscosity reducing chemical.

6. A method of increasing the specific gravity of an aqueous drilling mud while maintaining the viscosity within a normal operating range which includes adding celestite and a viscosity reducing chemical.

7. A method of increasing the specific gravity of an aqueous drilling mud at a greater rate than that at which the viscosity increases which comprises, adding celestite and a slight amount of a viscosity reducing chemical which is sufficient to maintain such rate of increase.

8. A method of maintaining a viscosity of less than 40 centipoises in a drilling mud while increasing the specific gravity to not to exceed 1.7 which comprises adding celestite until the viscosity approaches 40 centipoises, then adding a viscosity reducing chemical to reduce the viscosity, and again adding more celestite.

JOLLY W. O'BRIEN.